(12) United States Patent
Allman et al.

(10) Patent No.: US 6,480,643 B1
(45) Date of Patent: Nov. 12, 2002

(54) ON-CHIP MULTIPLE LAYER VERTICALLY TRANSITIONING OPTICAL WAVEGUIDE AND DAMASCENE METHOD OF FABRICATING THE SAME

(75) Inventors: Derryl D. J. Allman; Verne C. Hornbeck, both of Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/948,160

(22) Filed: Sep. 6, 2001

Related U.S. Application Data

(62) Division of application No. 09/217,184, filed on Dec. 21, 1998, now Pat. No. 6,324,313.

(51) Int. Cl.[7] .................................................. G02B 6/12
(52) U.S. Cl. .......................................... 385/14; 385/36
(58) Field of Search .............................. 385/14, 36, 33, 385/44, 31, 50, 900

(56) References Cited

U.S. PATENT DOCUMENTS

| 5,055,426 A | * | 10/1991 | Manning |
| 5,123,078 A | * | 6/1992 | Thomas |
| 5,198,008 A | * | 3/1993 | Thomas |
| 5,219,787 A | * | 6/1993 | Carey et al. |
| 5,235,663 A | * | 8/1993 | Thomas |
| 5,291,574 A | * | 3/1994 | Levenson et al. |
| 5,434,935 A | * | 7/1995 | Kragl |
| 5,465,860 A | * | 11/1995 | Fujimoto et al. |
| 5,540,346 A | * | 7/1996 | Fujimoto et al. |
| 5,600,741 A | * | 2/1997 | Hauer et al. |
| 5,614,765 A | * | 3/1997 | Avanzino et al. |
| 5,708,303 A | * | 1/1998 | Jeng et al. |
| 6,097,864 A | * | 8/2000 | Kropp |

* cited by examiner

*Primary Examiner*—Frank G. Font
*Assistant Examiner*—Layla Lauchman
(74) *Attorney, Agent, or Firm*—John R. Ley, LLC

(57) ABSTRACT

An optical waveguide extends vertically within the interior of an IC-like structure to route optical signals between horizontal waveguides in different layers of horizontal optical interconnects. A light reflecting structure is positioned at the intersection of the horizontal and vertical waveguides to reflect the light. Multiple horizontal waveguides may join the vertical waveguide at a common intersection, to form a beam splitter or a beam combiner. Optical signals from one horizontal waveguide are diverted within the IC-like structure into another horizontal or vertical waveguide. The waveguide is formed with a light reflective structure at an intersection of the horizontal and vertical waveguides, and the waveguide is completed using damascene fabrication techniques.

18 Claims, 6 Drawing Sheets

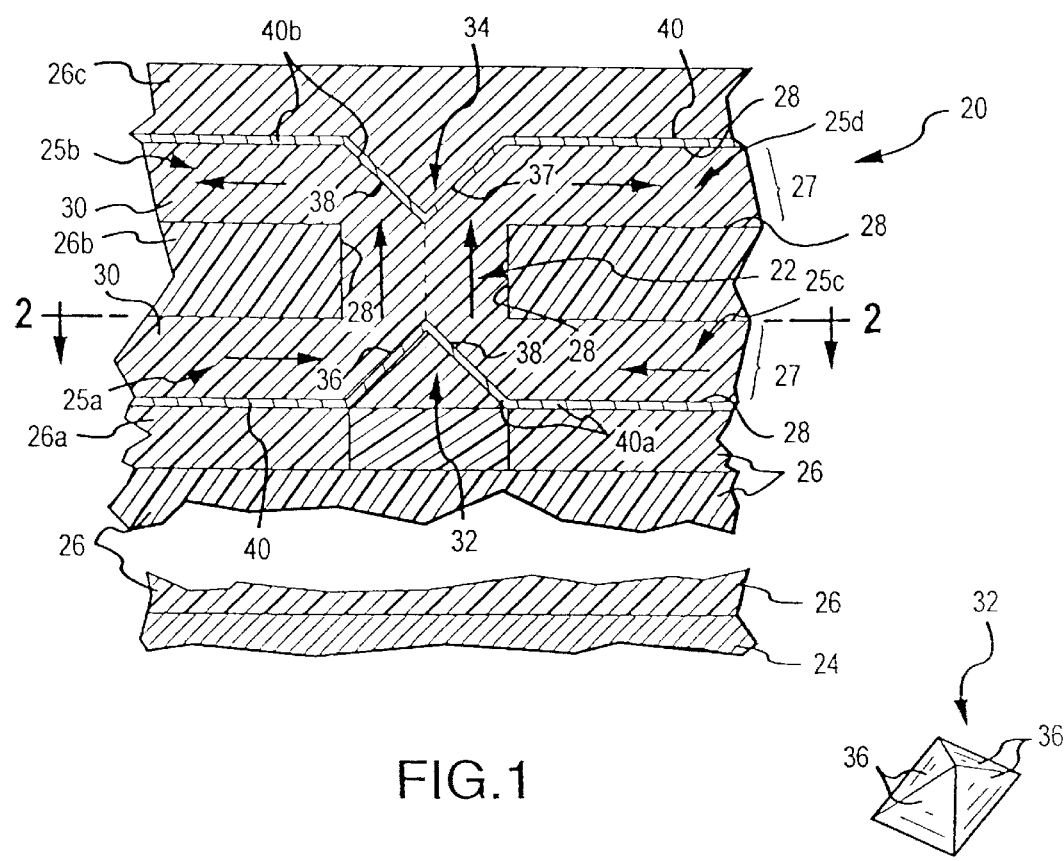
FIG.1
FIG.3
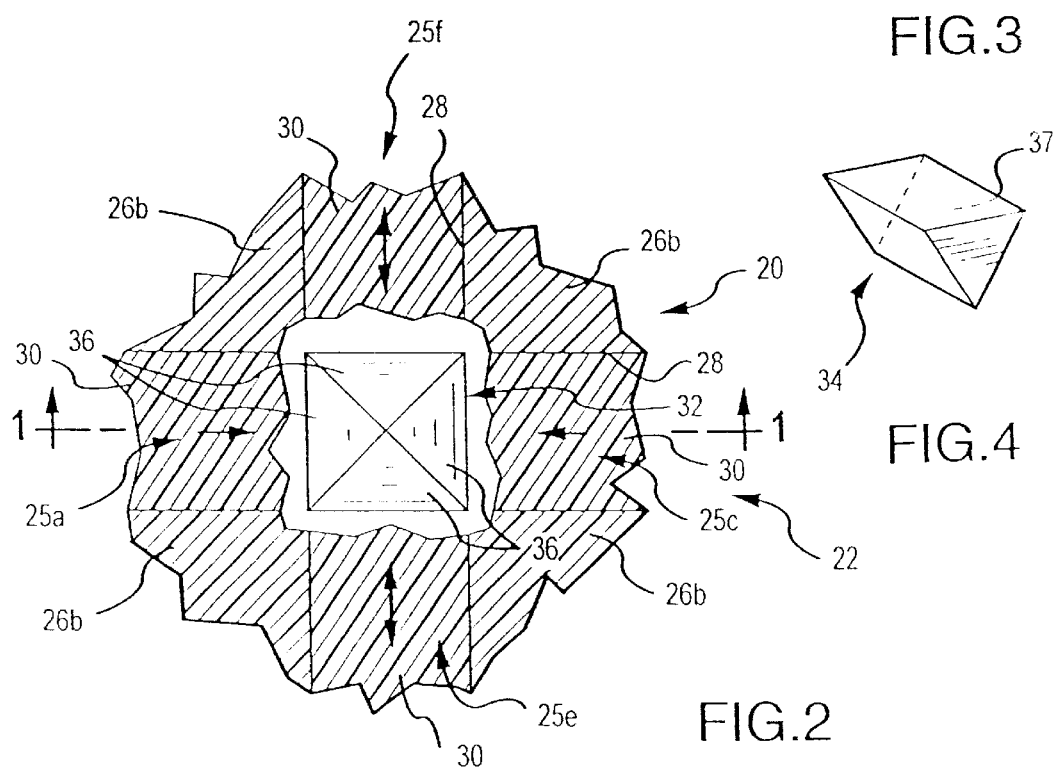
FIG.4
FIG.2

ON-CHIP MULTIPLE LAYER VERTICALLY TRANSITIONING OPTICAL WAVEGUIDE AND DAMASCENE METHOD OF FABRICATING THE SAME

CROSS-REFERENCE TO RELATED INVENTIONS

This is a division of U.S. application Ser. No. 09/217,184, filed Dec. 21, 1998, now U.S. Pat. No. 6,324,313. U.S. application Ser. No. 09/217,184 is related to the inventions for a "On-Chip Graded Index of Refraction Optical Waveguide and Damascene Method of Fabricating the Same" and "On-Chip Single Layer Horizontal Deflecting Optical Waveguide and Damascene Method of Fabricating the Same," described in U.S. patent applications Ser. Nos. 09/217,183 and 09/217,182, both filed Dec. 21, 1998. These applications are assigned to the assignee hereof. The subject matter of these applications is incorporated herein by this reference.

FIELD OF THE INVENTION

This invention relates to the routing of optical signals in waveguides located in interconnect layers of an integrated circuit (IC)-like structure. More particularly, this invention relates to a new and improved optical waveguide having the capability to route a optical signal vertically between separate horizontal layers of optical waveguides in an IC-like structure. The invention also relates to a new and improved method of fabricating an optical waveguide in an IC-like structure using damascene fabrication process steps that are typically employed in the fabrication of electrical integrated circuits.

BACKGROUND OF THE INVENTION

The ongoing evolution of microcircuit design has focused on the speed and size of electrical integrated circuit (IC) components, typically in a silicon chip. IC designers have continuously strived to make the IC faster and more functional while taking up less chip space. Currently, interconnection technology is considered as one of several areas that may be advanced to both increase the speed of the IC and to decrease the size of the chip.

For example, only a few years ago spacing between adjoining circuit elements in a typical IC was in the neighborhood of two to three microns. Today, many ICs are being designed at spacing distances as small as 0.35 microns or less. To accommodate narrower spacing and the increased functionality, more layers of conductors are formed above the substrate of the IC, to achieve the necessary number of electrical connections between the more densely located functional elements formed on the substrate of the IC. Advances in fabrication techniques allow as many as five or more separate horizontal layers of interconnect conductors.

Optical waveguides are sometimes considered as replacements or enhancements over the common metal conductors in IC-like structures. Optical signals allow the functional components to operate more quickly or at a higher speed, and unlike electrical signals, optical signals are usually not susceptible to noise and interference. In general, optical signal conduction, with its reduced susceptibility to noise and interference, obtains increased speed in data transmission and processing. Furthermore, due to the coherent nature of laser optical signals and their reduced susceptibility to noise, many more optical signals can be routed in one waveguide or layer of waveguides than is possible using conventional electrical signal interconnect conductors. Therefore, an IC-like structure incorporating optical interconnect waveguides may offer advantages in IC-like structures.

Because of the benefits from optical waveguides, the emphasis on more functionality from smaller sized devices, and the knowledge gained from the development of electrical ICs, it is expected that the evolution of IC-like structures which use waveguides to conduct optical signals will parallel the evolution of electrical ICs. With this historical perspective in mind, IC-like structures which partially or exclusively employ optical waveguides as interconnects are expected to be structured with multiple layers of interconnect waveguides.

The typical optical interconnection is a single waveguide or channel between the two components. In general, the waveguide defines a straight conductive path between conversion devices which convert electrical signals to optical signals and convert optical signals to electrical signals.

A space-effective physical placement and integration of various functional components in an IC-like structure requires considerable flexibility in routing the interconnects. Unfortunately, straight waveguides will not accommodate bends or corners since light signals do not travel around corners. Once a signal propagates the length of the channel, a directional coupler is used to redirect the signal if a change in direction is desired. Directional couplers may substantially increase the manufacturing cost of the IC-like structure, may make effective optical circuit layout impossible or impractical, and may result in a larger IC-like structure.

The previously mentioned patent application relating to the On-Chip Single Layer Horizontal Deflecting Optical Waveguide describes a waveguide and a method of manufacturing it which allow the waveguide to be bent in a horizontal plane. This improvement significantly increases the flexibility and routing of optical waveguides, allowing them to be routed and laid out in an IC-like structure to accommodate greater densities of functional components. However, to fully achieve the densities of functional components in IC-like structures, it will be necessary to also route optical signals from one horizontal layer of optical waveguides into a vertically adjoining horizontal layer of optical waveguides. Similar vertical routing of electrical signals has also been utilized effectively in higher density electrical ICs. However, there is no known previous technique for routing optical signals vertically between horizontal layers of optical waveguide interconnects within the interior of an IC-like structure.

It is with respect to these and other issues that the present invention has evolved.

SUMMARY OF THE INVENTION

One aspect of the present invention involves an optical waveguide which routes optical signals vertically between horizontal layers of optical waveguides in an IC-like structure. Another aspect involves forming a vertical optical waveguide between horizontally adjacent layers of optical interconnect waveguides within the interior of an IC-like structure. A further aspect involves allowing optical waveguides to be used as interconnects in an IC-like structure in a manner similar to the horizontal and vertical routing of electrical conductors in an IC. Still another aspect involves splitting an optical signal into multiple optical signals, or combining multiple optical signals into a signal optical signal, in a waveguide which transitions between a horizontal and a vertical orientation in an IC-like structure. Yet another aspect of this invention is to fabricate the present optical waveguide using known and reliable damascene process steps previously used to fabricate electrical ICs.

In accordance with these and other aspects, an optical waveguide extends vertically from a horizontally extending waveguide within an interior of an IC-like structure. The vertical waveguide includes a light reflecting structure positioned at the intersection of the horizontal and vertical waveguides to reflect light between the horizontal and vertical waveguides. A plurality of horizontal waveguides may be vertically separated from one another, with the vertical waveguide extending between the horizontal waveguides. The vertically separated horizontal waveguides may be formed in horizontal planes. A plurality of horizontal waveguides may join the vertical waveguide at a common intersection, to split a single light signal in the vertical waveguide into a plurality of light signals in the horizontal waveguides or to combine a plurality of light signals from the horizontal waveguides into a single light signal. Preferred features of the optical waveguide include forming the reflecting structure as a pyramid-like or a prism-like structure with reflective surfaces on side walls of the structures.

In accordance with other aspects, the invention also involves a method of vertically diverting optical signals from one horizontal waveguide in an IC-like structure into another horizontal waveguide which is vertically separated from the one horizontal waveguide. The method involves forming a via between the two vertically separated horizontal waveguides within the interior of an IC-like structure, and reflecting an optical signal from one horizontal waveguide through the via into the other horizontal waveguide. An optically reflective structure may be placed at an intersection of the horizontal waveguides and the via by which to reflect the optical signals into and out of the via.

In accordance with still other aspects, the invention pertains to a method of fabricating an optical waveguide to connect vertically separated layers of horizontal waveguides in an IC-like structure. The method involves forming a via between two horizontal waveguides in two vertically separated layers of horizontal waveguides, and forming a light reflective structure at an intersection of the via and each horizontal waveguide. The light reflective structure may be formed using high density plasma deposition in conjunction with a plasma sputtering process. The method also preferably relates to depositing dielectric material, forming the via and channels for the horizontal waveguides in the dielectric material, forming the light reflecting structures in the channels, and forming optically transmissive core material in the channels surrounding the light reflecting structures, all accomplished using damascene techniques.

The vertical optical waveguide routes optical signals between horizontal layers of optical waveguides within the interior of the IC-like structure similarly to the manner of routing electrical signals through via plug interconnects between different horizontal layers of electrical conductors in an IC. Consequently, the present invention allows optical interconnects to be employed on an efficient basis in an IC-like structure to facilitate higher densities of functional components and smaller IC-like structures. The IC-like structure may be conveniently formed using conventional damascene fabrication techniques, thereby contributing to the yield productivity in fabricating IC-like devices.

A more complete appreciation of the present invention and its scope, and the manner in which it achieves the above noted improvements, can be obtained by reference to the following detailed description of presently preferred embodiments of the invention taken in connection with the accompanying drawings, which are briefly summarized below, and by reference to the appended claims.

BRIEF DESCRIPTION OF THE DRAWINGS

FIG. 1 is a partial, vertical cross-sectional view of an integrated circuit-like structure having an on-chip multiple layer vertically transitioning optical waveguide which incorporates the present invention.

FIG. 2 is a partial top plan view of the vertically transitioning optical waveguide shown in FIG. 1, taken substantially in the plane of line 2—2 shown in FIG. 1 and further illustrating at line 1—1 the cross-sectional view from which FIG. 1 was taken.

FIG. 3 is a perspective view of a pyramid-like light reflecting structure of the vertically transitioning optical waveguide shown in FIGS. 1 and 2.

FIG. 4 is a perspective view of a prism-like light reflecting structure of the vertically transitioning optical waveguide shown in FIG. 1.

DETAILED DESCRIPTION

Figure 5:
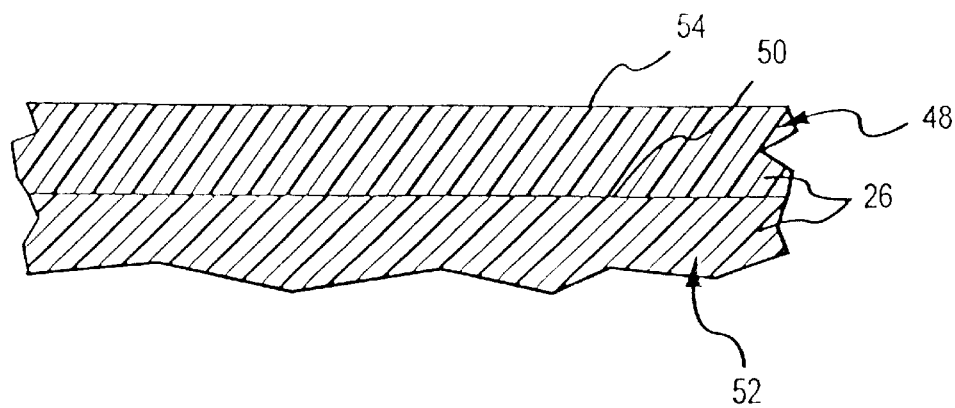
FIGS. 5–15 are cross-sectional views taken in a plane similar to that shown in FIG. 1, showing a sequence of steps involved in fabricating the waveguide shown in FIG. 1, according to the present invention.

A portion of an integrated circuit (IC)-like structure 20 incorporating an on-chip multiple layer vertically transitioning optical waveguide 22 is shown in FIGS. 1 and 2. The IC-like structure 20 may have functional electronic components (not shown) located in a substrate 24. The functional components may be electrically connected to each other by interconnect electrical conductors (not shown) located in layers above the substrate 24 and/or by a vertical waveguide 22 and horizontal waveguides 25a, 25b, 25c and 25d, for example. The horizontal waveguides 25a, 25b, etc., are formed as distinct, vertically-spaced and horizontally-extending layers 27 of optical interconnects in the IC-like structure 20. Dielectric material 26, formed in layers 26a, 26b, 26c, etc., separates the horizontal waveguides 25a, 25b, 25c and 25d from one another, separates the horizontal layers 27 of the waveguides from one another, and also separates the functional components of the substrate 24 from the waveguides 22, 25a, 25b, 25c and 25d. The vertical waveguide 22 connects to and extends vertically through the dielectric material 26 between the horizontal waveguides 25a and 25c of the lower horizontal layer 27 the horizontal waveguides 25b and 25d of the upper vertical horizontal layer 27.

In some types of IC-like structures, waveguides may be used exclusively to form interconnects between electrical components. In other types of IC-like structures, both optical waveguides and electrical conductors may be used as interconnects between functional components. In still other types of IC-like structures, only waveguides may be formed as optical interconnects, and no functional components will be present in the IC-like structure. All of these types of IC-like structures are within the ambit of the present invention.

Each vertical waveguide 22 and each horizontal waveguide 25a, 25b, 25c and 25d is formed in a channel 28 in the dielectric material 26. Each waveguide 22, 25a, 25b, 25c and 25d includes light transmissive core material 30 located in each channel 28. The light transmissive core material 30 allows optical signals (represented by the arrows) to propagate therethrough. Preferably, the core material 30 has a relatively high index of refraction compared to the index of refraction of the dielectric material 26, to take advantage of relatively high optical energy transmission efficiencies available from reflection of the light energy from the interface between the core material 30 and the dielectric material 26 at the channel 28, as is described in the above-mentioned patent application involving an On-Chip Graded Index of Refraction Optical Waveguide. Multiple layers of light transmissive core material having different indices of refraction may be used in the channels 28 to form graded index of refraction waveguides.

The vertical waveguide 22 also includes light reflecting structures formed in the shape of pyramid structure 32 and a prism structure 34. The light reflecting pyramid structure 32 is located at the junction of the lower horizontal waveguides 25a and 25c and the vertical waveguide 22, and the light reflecting prism structure 34 is located at the junction of the upper horizontal waveguides 25b and 25d and the vertical waveguide 22. Sides 36 and 37 of the light reflecting structures 32 and 34, respectively, reflect incident light from one of the vertical or horizontal waveguides into the other waveguide. The light reflecting structures 32 and 34 shown in FIG. 1 illustrate that light from one horizontal waveguide 25a or 25b (25c or 25d) is bent into the vertical waveguide 22, and from there is bent into the other horizontal waveguide 25b or 25a (25d or 25c). Of course, if the light signal need not be returned to the horizontal once it has been bent into the vertical direction, neither the light reflecting structure nor the second horizontal waveguide is necessary.

The lower light reflecting structure 32 is preferably formed as a regular geometric pyramid having four sides 36, as shown in FIG. 3. The upper light reflecting structure 34 is preferably formed as a prism having two sides 37, shown in FIG. 4. The sides 36 of the pyramid 32 and the sides 37 of the prism 34 are coated with thin layers 40a and 40b, respectively, of light reflective material 38, as shown in FIGS. 1 and 2. Preferably, the reflective material 38 is aluminum or similarly reflective type material. Although only single layers 40a and 40b of the reflective material 38 are shown on the waveguides 25a, 25b, 25c and 25d, the entire channel 28 of each waveguide may be coated with a layer of reflective material 38 to increase of optical energy transmission efficiency, as is described more completely in the above mentioned patent application relating to the On-Chip Single Layer Horizontal Deflecting Optical Waveguide.

Each of the sides 36 and 37 of the pyramid and prism structures 32 or 34, respectively, preferably extends at a 45° angle with respect to the horizontal and vertical references. The reflective material 38 on each side 36 and 37 of the light reflecting structures will therefore reflect an incident horizontally or vertically propagating light beam by 90°, turning the light beam from horizontal to vertical or from vertical to horizontal.

Each light reflecting structure 32 and 34 is located in alignment with the channel 28 of a horizontal waveguide 25a, 25b, 25c and 25d, and in alignment with the channel 28 of each vertical waveguide 22. Aligned in this manner, the reflective material 38 on the sides 36 and 37 of the structures 32 and 34 reflects light signals in one or more of the horizontal waveguides 25a, etc., into the vertical waveguide 22, reflects light signals in the vertical waveguide 22 into one or more of the horizontal waveguides 25a, etc. For example, a light beam traveling toward the right (as shown in FIG. 1) in the waveguide 25a will be reflected from the reflective material 38 on the left-hand side (as shown in FIG. 1) of the lower pyramid structure 32 vertically upward through the vertical waveguide 22 to the upper prism structure 34. The left-hand side 37 (as shown in FIG. 1) of the upper prism structure 34 will then reflect the light beam into the horizontal waveguide 25b, and the light will pass in that waveguide to the left (as shown in FIG. 1).

Although the sides 36 and 37 of the pyramid and prism structures 32 and 34 are shown and described as exhibiting 45° angles with respect to the horizontal and vertical references, variations in the angular orientation of the sides 36 and 37, and the orientation, position and alignment of the light reflecting structures 32 and 34 may direct the light beams into different paths. For example, the light beam incident on the lower pyramid structure 32 from the horizontal waveguide 25a may be reflected vertically upward to the right-hand side 37 (as shown in FIG. 1) of the upper prism structure 34, where the light beam will be reflected into the horizontal waveguide 25d.

In a similar manner, the light reflecting structures 32 and 34 may be employed as beam splitters and beam combiners. For example, the light beam reflected upward from the lower pyramid structure 32 may impinge equally on both the right-hand and the left-hand sides 37 (as shown in FIG. 1) of the upper prism structure 34, causing the single light beam to split and be reflected into both horizontal waveguides 25b and 25d.

The reverse effect is also possible, creating a beam combiner. For example, incident light beams from the horizontal waveguides 25b and 25d may reflect from the opposite left-hand and right-hand sides 37 (as shown in FIG. 1) of the upper prism structure 34 in a vertically downward direction to the lower pyramid structure 32. The vertical-traveling light beams may impinge on one side 36 of the lower pyramid structure 32, for example the right-hand side 36 (as shown in FIG. 1), and both beams will be reflected into the horizontal waveguide 25c thus combining those beams.

The beam combining and beam splitting effect may also be achieved in both dimensions of a single horizontal layer 27 of horizontal waveguide interconnects, as understood from FIG. 2. As shown in FIG. 2, four horizontal waveguides 25a, 25c, 25e and 25f combine and diverge at the lower pyramid structure 32. Thus, light signals directed from these four waveguides toward the pyramid structure 32 will be reflected upward from the sides 36 and combined in a vertical path. Conversely single or multiple light signals supplied vertically downward (as shown in FIG. 2) onto the pyramid structure 34 may be directed into one or more of each of the horizontal waveguides 25a, 25c, 25e and 25f.

Further still, by orienting the pyramid and prism structures at the junction of the horizontal and vertical waveguides, a change of direction in a horizontal reference direction may be obtained for a light beam as well as a vertical change between different horizontal layers 27 of optical interconnects. For example, the upper prism structure 34 may reflect a light beam traveling from right to left in the horizontal waveguide 25b (FIG. 1) vertically downward to the lower pyramid structure 32, where the light beam will impinge on the top (as shown in FIG. 2) side 36 of the lower pyramid structure 32, thus reflecting the light beam into the horizontal waveguide 25f. Although both waveguides 25b and 25f extend in horizontal planes in each layer 27 (FIG. 1), the waveguides 25b and 25f extend at right angles in this horizontal plane with respect to one another. Therefore, the light beam undergoes a 90° turn in the horizontal plane as well as traveling vertically between the vertically separated layers of horizontal waveguide interconnects.

Although a four-sided pyramid structure 32 results from the fabrication process for building this reflective structure as described below in conjunction with FIG. 7, a prism structure could also be employed if the light beam is not to be split or combined from four intersecting paths in the horizontal plane as shown in FIG. 2. The upper prism structure 34 is triangular shaped because the light is reflected, split and combined with respect to the horizontal waveguides 25b and 25d and the vertical waveguide 22, all of which fall within a single vertical plane. However, a pyramid light reflecting structure could be substituted for the upper prism structure 34, if the orientation of the horizontal waveguides in the upper layer 27 (FIG. 1) are similar to those shown in FIG. 2 for the lower horizontal layer 27.

Thus, the vertical waveguide 22 of the present invention allows light beams in horizontal waveguides 25a, etc. to be vertically routed to different layers 27 of horizontal optical interconnect waveguides within the IC-like structure, in a manner similar to the way that conventional via plug interconnects conduct electrical signals vertically between layers of electrical interconnects. Optical interconnects layers may be laid out in optical IC-like structures with greater flexibility and opportunity to achieve greater levels of density in functional components.

The vertical waveguide 22 can be formed using conventional damascene semiconductor fabrication techniques, using the same materials and process steps employed in creating electrical IC-like structures 20. Details concerning the process steps for fabricating the optical waveguide 22 shown in FIGS. 1, 2 and 3 are described below in sequence in conjunction with FIGS. 5–15.

The process steps of forming the vertical waveguide 22 generally begin at the stage shown in FIG. 5 where a layer 48 of dielectric material 26 has been formed on a surface 50 of a previously planarized layer 52 of interlayer dielectric material 26 using conventional deposition techniques. Although shown as interlayer dielectric material 26, the planarized layer 52 on which the layer 48 is deposited may comprise something other than dielectric material, e.g., substrate metal or another type of interlayer dielectric material. The surface 50 upon which the layer 48 is deposited has been polished in an earlier step and is relatively even. Preferably the layer 48 is deposited with a deposition process involving either chemical vapor deposition (CVD) or a spin-on deposition resulting in a layer 48 having a relatively uniform depth and a relatively smooth upper surface 54.

Figure 6:
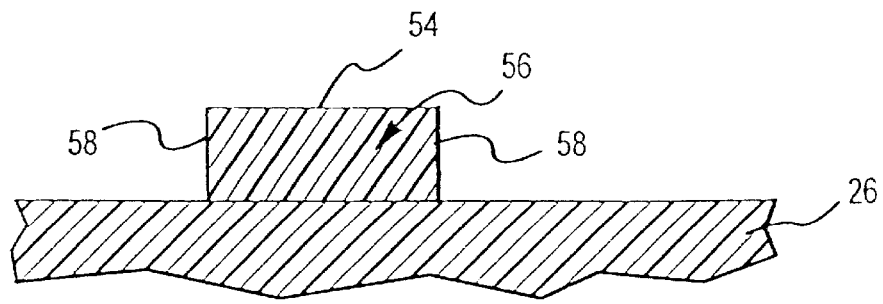

A post 56 is next formed as shown in FIG. 6. Forming the post 56 involves etching the excess material from the layer 48 (FIG. 5) surrounding the post 56. The excess material from the layer 48 is first patterned using conventional photoresist deposition and lithographic patterning techniques, and is then etched away preferably using known reactive ion etching techniques. The post 56 has substantially vertical side walls 58 and a substantially horizontal top surface 54. The substantially vertical side walls 58 are an inherent result of the reactive ion etching techniques. The post 56 has a predetermined height, determined by the thickness of the layer 48 deposited as shown in FIG. 5. The post 56 also has a predetermined width and depth, which is established by the photolithographic patterning and reactive ion etching steps. The predetermined height, width and depth of the post 56 are important in the formations of the lower pyramid structure 32 (FIG. 1) as will be apparent from the following description.

Figure 7:
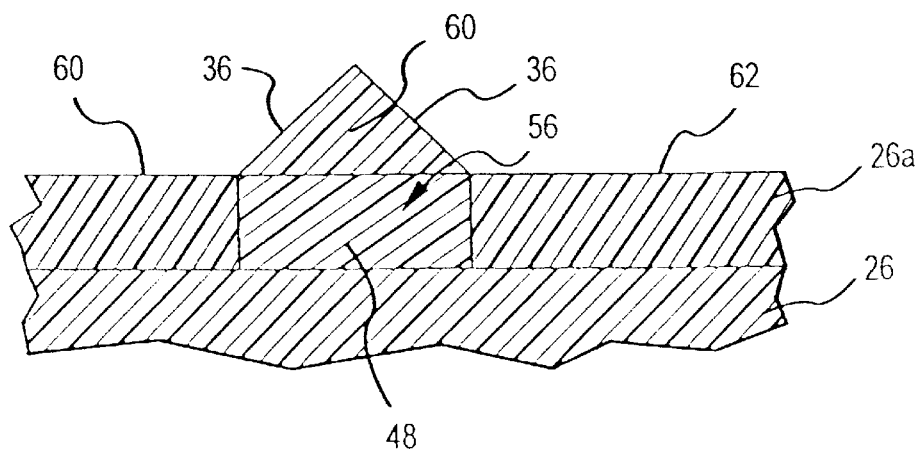

Following the formation of the post 56, dielectric material forming the dielectric layer 26a is deposited as a projection 60 on top of the post 56 and as the dielectric material layer 26a adjoining its side walls 58 of the post 56, as shown in FIG. 7. Preferably, the dielectric material of the projection 60 and the layer 26a is the same as the material 48 from which the post 56 is formed. The dielectric material of the projection 60 and the layer 26a is deposited by high density plasma deposition (HDP). HDP is a combination of general chemical vapor deposition (CVD) and simultaneous sputter etching. The HDP deposition of the dielectric material results in a relatively uniform thickness of the dielectric material layer 26a and causes the shape of the upper projection 60. The shape of the upper projection 60 may be the four-sided regular pyramid structure 32 shown in FIG. 3, or an elongated prism-shaped structure, under the conditions explained above. The width and depth of the post 36 (laterally and perpendicularly in the view shown in FIG. 7) establishes whether the projection 60 will be a regular four-sided pyramid shape or a prism shape. For a four-sided pyramid shape, the width and depth of the post 56 are approximately equal. For a prism shape, the post has a depth dimension which is considerably greater than the width dimension, and any sloping ends of the projection 60 are removed to create rectangularly shaped side walls of the projection 60. In any case, the side walls 36 are preferably formed at 45° with respect to the upper surface 58 of the post 56 and with respect to an upper surface 62 of the layer of dielectric material 26.

Figure 8:
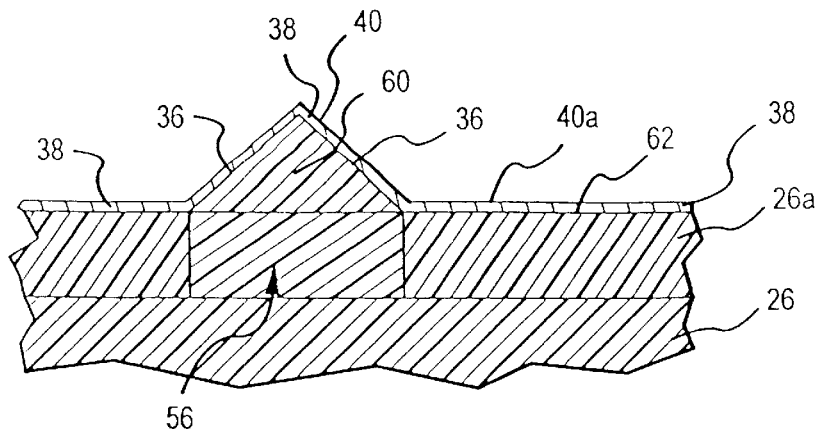

Next, as shown in FIG. 8, the layer 40a of the reflective material 38 is deposited on the side walls 36 of the projection 60 and on the adjacent upper surface 62 of the dielectric material 36. The deposition of the reflective material 38 is preferably achieved by CVD, physical vapor deposition (PVD) or spin-on deposition. The layer 40a of reflective material 38 causes reflections of the light beam in the manner described in conjunction with FIG. 1.

Figure 9:
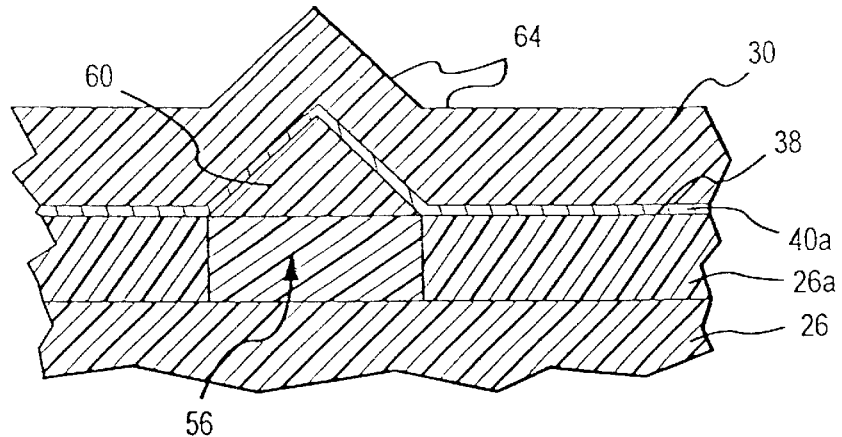

The next step shown in FIG. 9 involves the deposition of the light transmissive waveguide core material 30 on the layer 40a of the reflective material 38. The core material 30 is preferably deposited by CVD or spin-on deposition. The core material 30 forms the various horizontal waveguides 25a, 25c, 25e and 25f (FIG. 2). Depositing the core material 30 generally results in an uneven upper surface 64 because the underlying layer 40a of reflective material 38 is not even above the projection 60.

Figure 10:
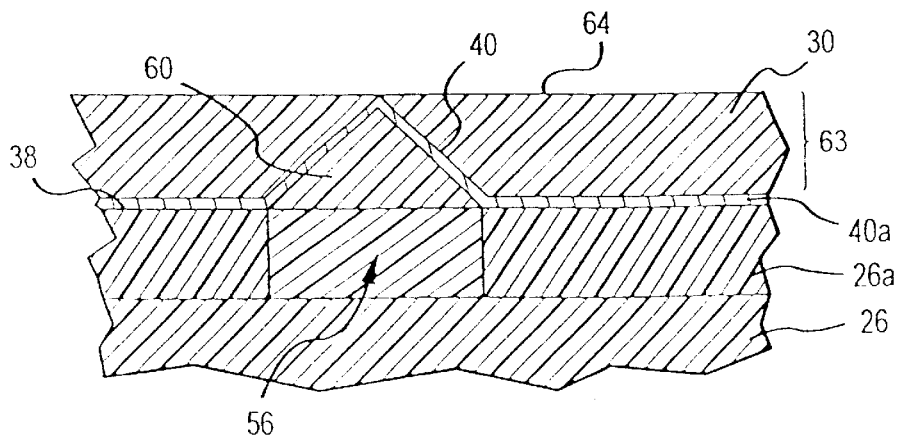

However in the next step shown in FIG. 10, the upper surface 64 of the core material 30 is planarized, preferably using chemical mechanical polishing (CMP). Planarizing the core material 30 forms a layer 63 of the core material, and the layer 63 forms the light transmissive core material for the horizontal waveguides 25a, 25c, 25e and 25f (FIG. 2).

Figure 11:
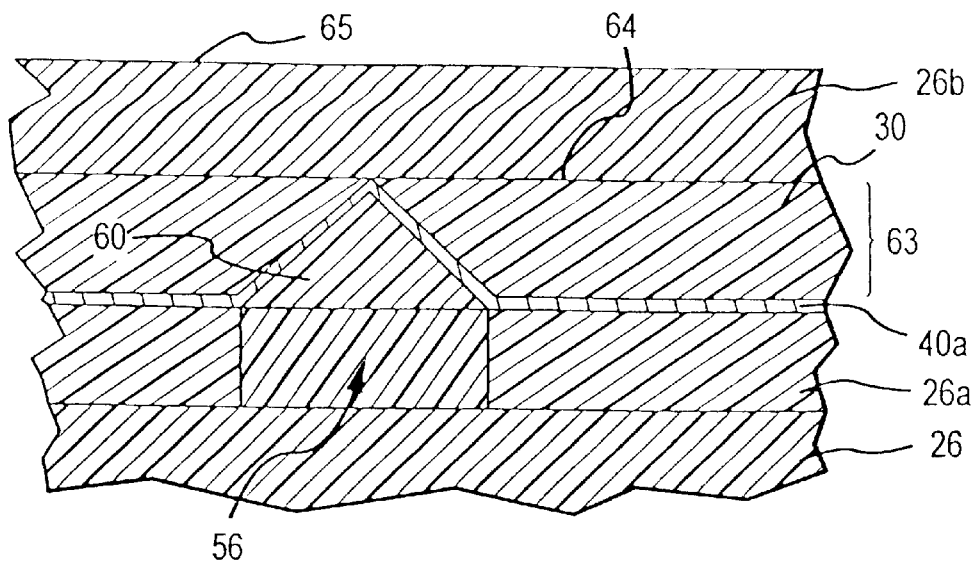

Following the deposition on the upper surface 64 of the core material 30, the next step is the deposition of more interlayer dielectric material 26 in the layer 26b as shown in FIG. 11. The deposition of the dielectric material layer 26b may be accomplished using high density plasma deposition (HDP) but is preferably accomplished using conventional CVD techniques. An upper, generally planar surface 65 of the layer 26b results from either the deposition of the layer 26b or from the application of planarizing processes.

Figure 12:
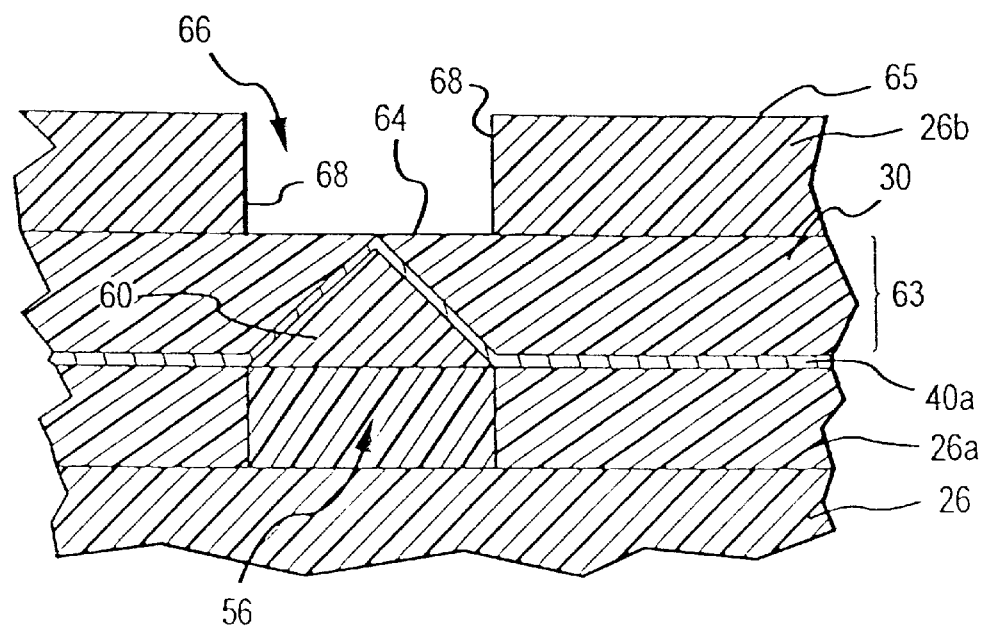

Next, a via 66 is etched in the layer 26b as shown in FIG. 12, using conventional photoresist deposition, lithographic patterning and reactive ion etching processes. The via 66 is etched to remove all the dielectric material of the layer 26b down to the upper surface 64 of the core material 30, exposing the core material 30 in the via 66. Stopping the reactive ion etching process requires either timing the etch process to stop at a predetermined depth, using a predetermined chemicals in the reactive ion etch step that will not etch the core material 30, or alternatively, using an etch stop layer formed on the surface 64 of the core material 30. Using an etch stop layer requires that the layer does not adversely influence the optical transmissive characteristics of the core material 30 or that the layer be removed following the reactive ion etch process step.

Figure 13:
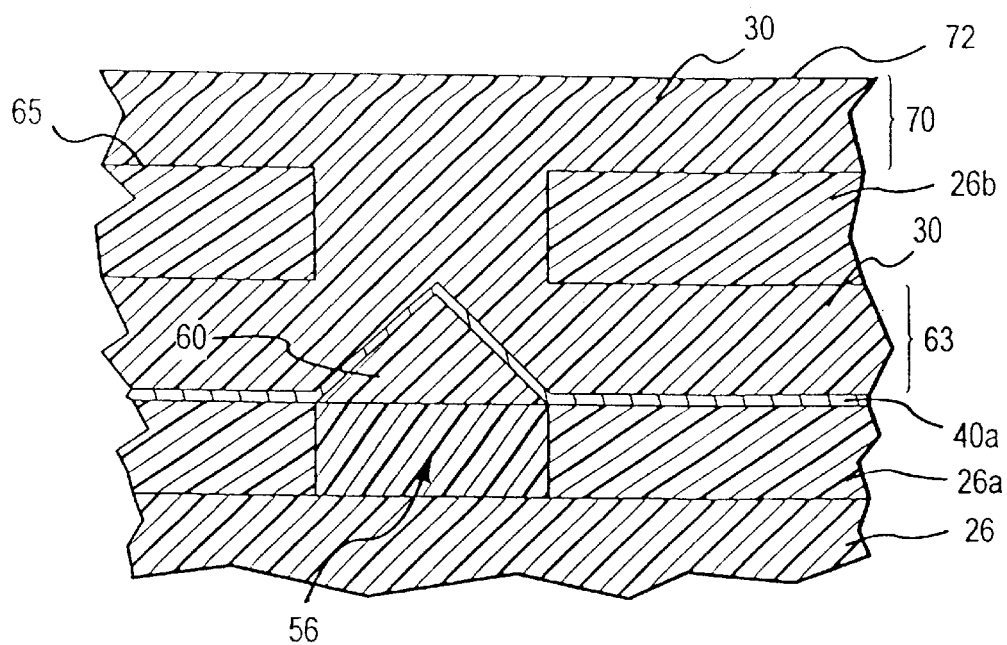

Following the formation of the via 66, the next step involves deposition of more core material 30 in the via 66 and in a layer 70, as shown in FIG. 13. The deposition of the core material 30 process fills the open space in the via 66 and forms the layer 70 of core material 30 across the top surface 65 of the layer 26b. The core material 30 of the layer 70 and in the via 66 is preferably deposited by CVD or spin-on processes. An upper surface 72 of the layer 70 is either generally planar as a result of the core material deposition, or is made planar by planarizing techniques such as CMP. The layer 70 of core material 30 forms the light transmissive core material of the horizontal waveguides 25b and 25d (FIG. 1).

Once the core material 30 has filled the via 66 and has formed a level upper surface 72 on the layer 70, a V-shaped notch 74 is formed into the layer 70, preferably in vertical alignment with the via 66 and above the projection 60. The V-shaped notch is preferably formed by first forming a relatively small trench (not shown) into the layer 70 using conventional photoresist depositing, photolithographic patterning and reactive ion etching. Then, using radio frequency (RF) sputtering or HDP erosion the upper corners of the trench are faceted to an angle between 40 and 50 degrees with respect to the horizontal and vertical, as shown to create the notch 74.

To form a pyramid structure, a cubical trench might is first etched into the layer 70. Thereafter, the RF sputtering or HDP erosion process will eliminate the upper right corners of the trench and extend the flat bottom of the trench to a point, thereby forming the V-shaped notch 74. Forming the notch 74 in the V-shape is a conventional HDP erosion process, and typically results in side walls 76 which extend approximately at a 40 to 50 degree angle with respect to the horizontal and vertical, as shown.

Figure 14:
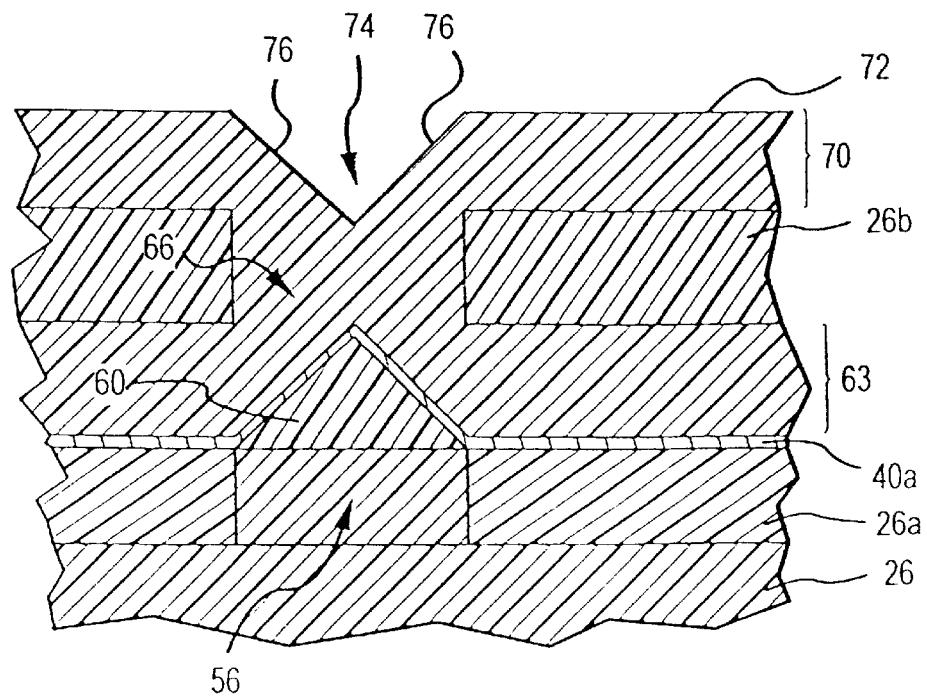

Alternatively, the notch 74 can be formed using HDP. Beginning with the configuration shown in FIG. 12, HDP is used to fill the via 66. The HDP process uses a deposition to sputter ratio which forms 40 to 50 degree angled portions of the deposited material 30 at the corners of the via 66 which become corner facets. Once the via 66 has been filled, the deposition to sputter ratio is adjusted such that as more deposition occurs, the corner facet angles are maintained and material 30 is uniformly deposited, forming the notch 74 as shown in FIG. 14.

Figure 15:
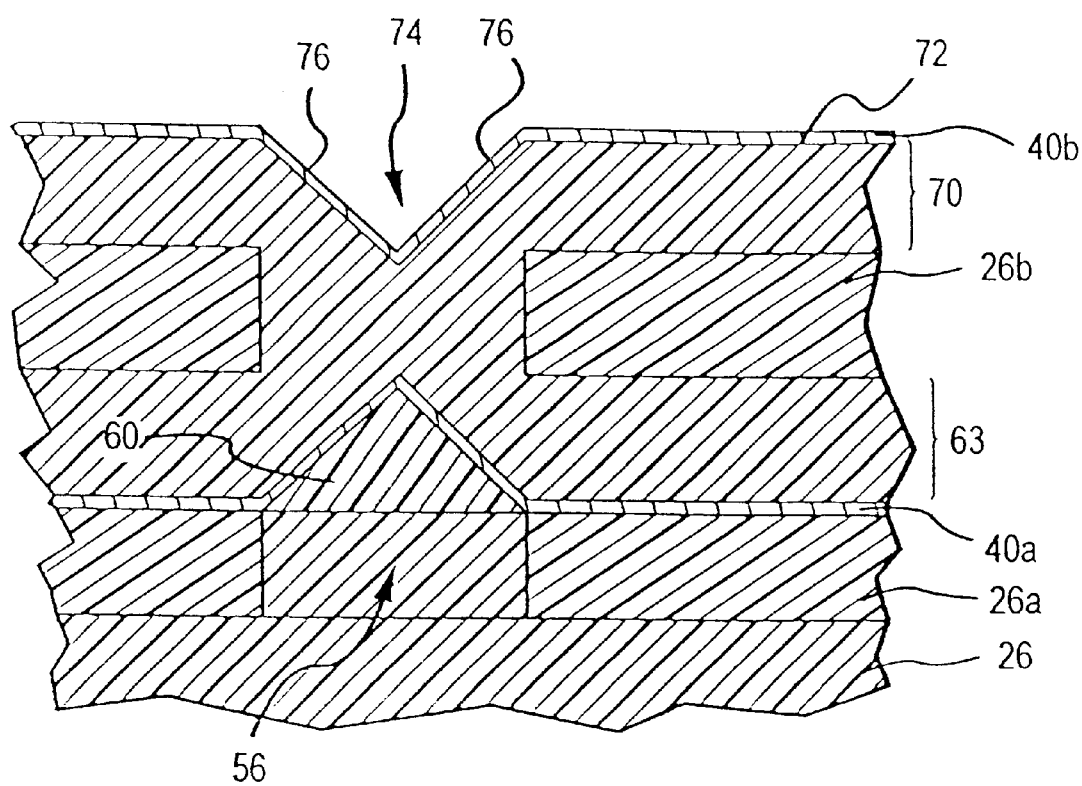

The layer 40b of reflective material 38 is next deposited on the upper surface 72 of the core material layer 70 and on the side walls 76 of the V-shaped notch 74, as shown in FIG. 15. The layer 40b of reflective material 38 is preferably deposited by CVD, PVD or spin-on deposition. The layer 40b causes reflections of the light beam in the manner described in conjunction with FIG. 1. The reflective material 38 of the layer 40b is preferably the metal from which the layer 40a has been formed.

To complete the IC-like structure 20 shown in FIG. 1, the top layer 26c of dielectric material is deposited on top of the reflective layer 40b. The deposition of the dielectric material layer 26c is accomplished by high density plasma deposition (HDP), or by CVD or a spin-on deposition.

As is apparent from the process steps just described in conjunction with FIGS. 5–15, the vertical waveguide 22 of the invention may be conveniently fabricated using known damascene process steps already used to fabricate electrical ICs. As such, incorporating the vertical and horizontal optical waveguides of the present invention in an IC-like structure, or simply constructing an entirely optical IC-like structure is more easily and reliably accomplished by using known process steps which are compatible with other process steps used to fabricate the IC-like structure. The conventional IC fabricating steps are highly reproducible and have a predictable yield.

Preferred embodiments of the waveguides and methods of manufacturing them have been shown and described with a degree of particularity. The following claims define the scope of the invention, and that scope should not necessarily be limited to the preferred embodiments described above.

The invention claimed is:

1. A method of fabricating an optical waveguide to connect vertically separated layers of horizontal waveguides in an IC-like structure, comprising the steps of:
   forming a via between two horizontal waveguides in two vertically separated layers of horizontal waveguides; and
   forming a light reflective structure at an intersection of the via and each horizontal waveguide.

2. A method as defined in claim 1 further comprising the step of:
   forming the light reflective structure by high density plasma deposition.

3. A method as defined in claim 2 further comprising the step of:
   forming the light reflective structure as a pyramid-like structure.

4. A method as defined in claim 3 further comprising the step of:
   forming the light reflective structure as a prism-like structure.

5. A method as defined in claim 2 further comprising the step of:
   forming a reflective surface on the exterior of the structure formed by the high density plasma deposition.

6. A method as defined in claim 1 further comprising the step of:
   forming the light reflective structure by high density plasma erosion.

7. A method as defined in claim 6 further comprising the step of:
   forming the light reflective structure as a pyramid-like structure.

8. A method as defined in claim 6 further comprising the step of:
   forming the light reflective structure as a prism-like structure.

9. A method as defined in claim 6 further comprising the step of:
   forming a reflective surface on the exterior of the structure formed by the high density plasma deposition.

10. A method as defined in claim 1 further comprising the steps of:
    depositing dielectric material;
    forming the via and channels for the horizontal waveguides in the dielectric material;

forming the light reflecting structures in the channels; and forming optically transmissive core material in the channels surrounding the light reflecting structures.

11. A method as defined in claim 10 further comprising the step of:

forming the light reflecting structure in a relatively lower one of the horizontal waveguides prior to forming the optically transmissive core material in the channel of the relatively lower horizontal waveguide.

12. A method as defined in claim 11 further comprising the step of:

forming the light reflective structure in the relatively lower horizontal waveguide by high density plasma deposition.

13. A method as defined in claim 10 further comprising the step of:

forming the light reflecting structure in a relatively higher one of the horizontal waveguides after forming the optically transmissive core material in the channel of the relatively higher horizontal waveguide.

14. A method as defined in claim 13 further comprising the step of:

forming the light reflective structure in the relatively higher horizontal waveguide by high density plasma erosion.

15. A method as defined in claim 10 further comprising the steps of:

forming the light reflecting structure in a relatively lower one of the horizontal waveguides prior to forming the optically transmissive core material in the channel of the relatively lower horizontal waveguide;

forming the light reflective structure in the relatively lower horizontal waveguide by high density plasma deposition;

forming the light reflecting structure in a relatively higher one of the horizontal waveguides after forming the optically transmissive core material in the channel of the relatively higher horizontal waveguide; and forming the light reflective structure in the relatively higher horizontal waveguide by high density plasma erosion.

16. A method of vertically diverting optical signals from one horizontal waveguide in an IC-like structure into another horizontal waveguide which is vertically separated from the one horizontal waveguide, comprising the steps of:

forming a via between the two vertically separated horizontal waveguides within the interior of the IC-like structure; and reflecting an optical signal from one horizontal waveguide through the via into the other horizontal waveguide.

17. A method as defined in claim 16, further comprising the step of:

placing a reflective structure at an intersection of the horizontal waveguides and the via by which to reflect the optical signals into and out of the via.

18. A method as defined in claim 17, further comprising the step of:

locating an optically reflective structure at each intersection of the via and the horizontal waveguides.

\* \* \* \* \*